(No Model.)
L. BERRY.
BICYCLE.
No. 494,839.
Patented Apr. 4, 1893.
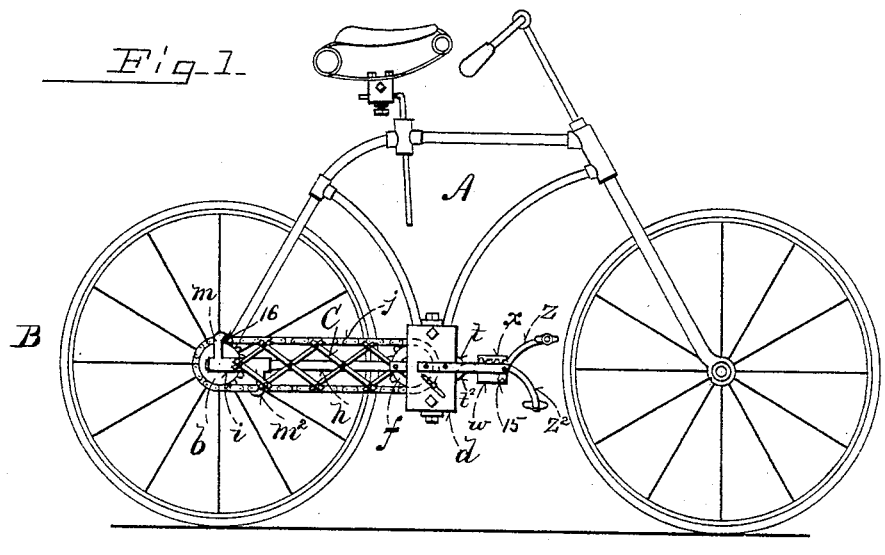
Fig. 1.
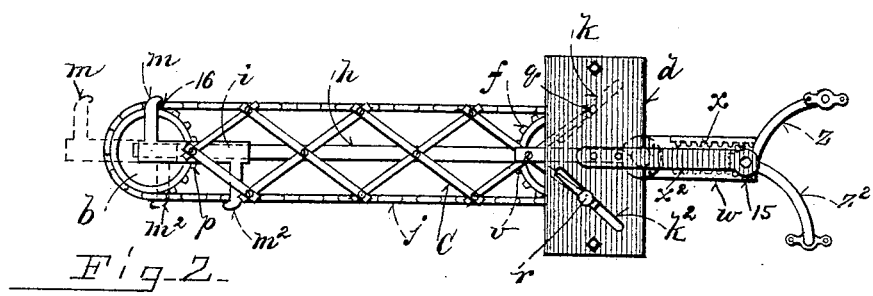
Fig. 2.
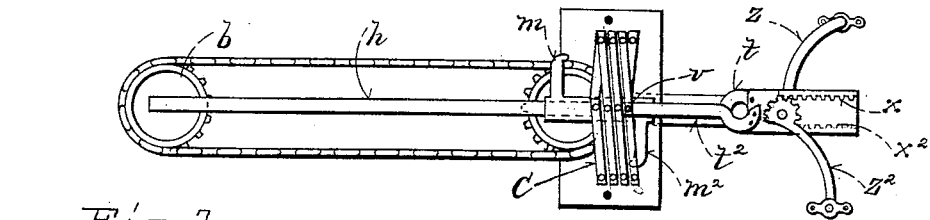
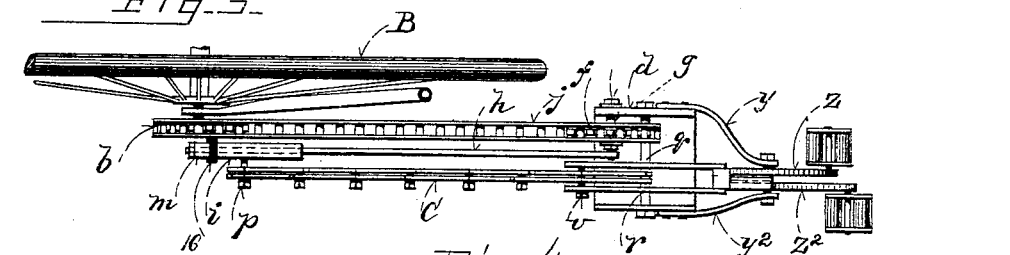
Fig. 3.
Fig. 4.
WITNESSES:
INVENTOR:
Leander Berry
By C. A. Shaw & Co.
Att'ys.

UNITED STATES PATENT OFFICE.

LEANDER BERRY, OF HAVERHILL, MASSACHUSETTS.

BICYCLE.

SPECIFICATION forming part of Letters Patent No. 494,839, dated April 4, 1893.

Application filed August 22, 1892. Serial No. 443,721. (No model.)

*To all whom it may concern:*

Be it known that I, LEANDER BERRY, of Haverhill, in the county of Essex, State of Massachusetts, have invented certain new and useful Improvements in Bicycles, of which the following is a description sufficiently full, clear, and exact to enable any person skilled in the art or science to which said invention appertains to make and use the same, reference being had to the accompanying drawings, forming part of this specification, in which—

Figure 1 is a side elevation of a bicycle provided with my improved driving mechanism; Fig. 2 a side elevation enlarged of the actuating mechanism representing the tongs extended and in position for beginning the return movement; Fig. 3 a like view showing the tongs collapsed at the end of the return movement; and Fig. 4 a top plan view of the actuating mechanism.

Like letters and figures of reference indicate corresponding parts in the different figures of the drawings.

My invention relates especially to actuating mechanism for bicycles of the class known as "Safeties" whereby an increased rate of speed may be attained without corresponding expenditure of power or enlargement of the gears or sprocket-wheels; and it consists in certain novel features hereinafter fully set forth and claimed, the object being to produce a simpler, cheaper and more effective device of this character than is now in ordinary use.

The nature and operation of the improvement will be readily understood by all conversant with such matters from the following explanation:

In the drawings, A represents the frame of the bicycle and B the drive-wheel. These parts are of the ordinary construction and arrangement.

On the axle of the drive-wheel, B, a sprocket-wheel, $b$, is secured.

A box, $d$, is supported from the fork of the frame, A. On said fork a sprocket-wheel, $f$, is journaled on a spindle, $g$, said wheel being of the same diameter as the sprocket, $b$. A horizontally arranged bar or head, $h$, connects the spindle, $g$, with the axle of the wheel, B. Said bar forms a run or way for a traveler, $i$, hereinafter described. A jack-chain, $j$, connects the sprockets, $b$, $f$.

In the face-plate of the box, $d$, there are two cam grooves, $k$, $k^2$, arranged at right angles to each other and diagonally of the line of travel of the chain, $j$. The traveler, $i$, consists of a box fitted to slide on the rod, $h$. Adjacent each end of said traveler and projecting at right angles thereto respectively in opposite directions there are two hooked-shaped arms, $m$, $m^2$, the hooks thereof turning in opposite directions. A series of compound-levers of the class known as "lazy tongs," C, have their outer ends pivoted centrally at, $p$, to the traveler, $i$. The opposite ends of said levers are respectively provided with guide-bolts $q$, $r$, which work in the cam-grooves, $k$, $k^2$. Two parallel arms, $t$, $t^2$, have their inner ends mounted on the pivot, $v$, of the lazy tongs and project through the box, $d$. The outer ends of the arms, $t$, $t^2$, are secured to the rack-plate, $w$. This rack-plate has on opposite faces two racks, $x$, $x^2$, respectively facing in opposite vertical directions.

Supported in arms, $y$, $y^2$, projecting from the box, $d$, pedals, $z^2$, $z$, are pivoted. At their pivots these pedals are provided with segmental pinions, 15, respectively meshing with the racks, $x$, $x^2$, so that they will when reciprocated vertically drive the rack-plate in opposite directions. A pin, 16, projects laterally from the jack-chain, $j$, into the path of the arms, $m$, $m^2$, on the traveler, $i$.

In the use of my improvement the parts being in the position shown in Fig. 2, the tongs, C, are distended, the traveler, $i$, being started on its return movement on the rod, $h$. This movement is continued by depressing the pedal, $z$, which draws the rack-plate, $w$, outward from the box. The pull of the rods, $t$, $t^2$, secured to said plate being centrally from the pivot, $v$, of the tongs as said plate is thus actuated spreads the free ends of the tong-levers toward the outer ends of the cam-grooves causing the lazy-tongs to gradually collapse and draw the treadles, $i$, forward. The arm, $m$, on said traveler taking on the pin, 16, on the jack-chain carries said chain with it and drives the sprocket, $b$. When the lazy-tongs is collapsed the traveler has completed its course forward and is in the position shown in Fig. 3. The impetus of the wheel will carry the pin, 16, on the chain around the sprocket, $f$, until it ends into the path of the arm, $m^2$, which has been projected beyond said sprocket to permit this. This movement of the rack-plate has elevated the pedal, $j^2$, which is now depressed by the rider driving the plate in the opposite direction and drawing the adjacent ends of the lazy-tongs together by means of the cam-grooves in the box, $d$. This projects the tongs and the arm, $m^2$, on the traveler carries the jack-chain with it, such traveler projecting at the end of its course its arm, $m$, beyond the sprocket, $b$, so that the pin, 16, on leaving contact with the arm, $m^2$, can pass around said sprocket, $b$, into the path of the arm, $m$, of the traveler, when by depressing the companion-pedal the operation is repeated. By increasing the number of levers in the tongs and the belt or chain correspondingly without changing the diameter of the sprockets the number of revolutions of the sprockets is increased, attaining practically twice the speed with the same expenditure of strength than when the ordinary crank-pedal is employed to drive the sprocket positively. To increase or gain power the sections of levers in the lazy-tongs are shortened and the diameter of the pedal pinion is decreased correspondingly. It will be understood that pulleys may be substituted for the sprockets and a friction belt be employed to drive them.

I do not confine myself to the exact mechanism shown for driving the levers or connecting the same with the jack-chain. Nor do I confine myself to the use specifically with a bicycle as the movement is applicable for driving wheels for other purposes.

As tricycles propelling boats and other vehicles, the primary feature of my invention comprises the driving of a belt or chain connecting two wheels or a wheel and shaft by the movement of a system of levers substantially as described.

Any form of cams other than that shown as grooves, $k$, $k^2$, may be employed to guide the inner ends of the levers, convenience in mounting the apparatus and the uses to which the movement is applied governing this.

Having thus explained my invention, what I claim is—

1. The combination with two wheels connected by a belt or chain of a lazy-tongs system of levers; a connection between one of the pivots thereof and said chain and mechanism for operating said levers, substantially as described.

2. The combination with two wheels connected by a belt or chain of a lazy-tongs system of levers; a connection between one of the pivots thereof and said chain and crank-actuated mechanism for operating said levers, substantially as described.

3. The combination with two wheels connected by a belt or chain of a lazy-tongs system of levers; mechanism connecting a pivot thereof with the chain; and a reciprocating rack connecting with a pivot of said levers, substantially as and for the purpose set forth.

4. The combination with two wheels and a belt or chain connecting them of a traveler fitted to reciprocate between the axes of said wheels; a projection on the chain adapted to be engaged by said traveler; a lazy-tongs system of levers pivotally connected with said traveler and mechanism for operating said levers, substantially as described.

5. The combination with two wheels and a belt or chain connecting the same of a traveler moving between said wheels and outside the plane thereof; a lazy-tongs system of levers pivotally connected with the traveler an intermittent connection between the traveler and belt; a reciprocating rack pivotally connected with said levers; and a pedal or crank mechanism for actuating said rack, substantially as described.

6. In a bicycle the drive-wheel and frame in combination with a sprocket-wheel on the axle of said drive-wheel; a sprocket on said frame; a chain connecting the sprockets; a traveler fitted to move between the axes of said sprockets; a connection between the traveler and chain; a lazy-tongs system of levers pivotally connected to the traveler and a pedal actuated mechanism supported from the frame for operating said levers, substantially as described.

7. In a bicycle, the drive-wheel, frame, sprockets and connecting chain in combination with a slide way connecting the axial lines of said sprockets; a traveler in said way; a connection between the traveler and chain; a lazy-tongs system of levers pivotally connected with said traveler; and a pedal-actuated reciprocating rack pivotally connected with said levers, substantially as described.

8. In a bicycle the drive-wheel, frame, sprockets and connecting chain in combination with the lazy-tongs levers, C, a connection between said levers and chain; the reciprocating rack-plate pivotally connected with said levers; the pedals supported from said frame; and pinions on said pedals meshing with the racks on said plate, substantially as described.

9. In a bicycle the drive-wheel, frame and sprockets in combination with the connecting chain; the way, $h$, and traveler, $i$, thereon; a projection on said chain adapted to alternately engage arms on said traveler; the series of levers, C, pivotally connecting with the traveler; guides on the frame for the free ends of said levers and the pedal-actuated rack-plate pivotally connected to said levers, all being arranged to operate substantially as described.

LEANDER BERRY.

Witnesses:
H. G. PRATT,
T. L. BERRY.